United States Patent [19]
Döring

[11] Patent Number: 5,397,277
[45] Date of Patent: Mar. 14, 1995

[54] DOOR DRIVE MECHANISM INCLUDING BELT TRANSMISSION FOR DOORS

[76] Inventor: Erich Döring, Im Hölzeli, CH 9442 Berneck, Switzerland

[21] Appl. No.: 158,576

[22] Filed: Nov. 29, 1993

[30] Foreign Application Priority Data

Nov. 27, 1992 [DE] Germany ............. 42 39 962.9

[51] Int. Cl.6 ............................................. F16H 7/00
[52] U.S. Cl. .................................... 474/153; 474/148
[58] Field of Search ........................... 474/152–156, 474/148, 101, 133–134

[56] References Cited

U.S. PATENT DOCUMENTS

| | | | |
|---|---|---|---|
| 3,083,582 | 4/1963 | Wheeler | 474/148 X |
| 3,719,098 | 3/1973 | Graves | 474/184 X |
| 4,758,208 | 7/1988 | Bartos et al. | 474/134 X |
| 5,078,658 | 1/1992 | Legg | 474/148 |
| 5,230,665 | 7/1993 | Tanaka et al. | 474/153 |

FOREIGN PATENT DOCUMENTS 1379737 10/1964 France.
238093 6/1986 Germany.

OTHER PUBLICATIONS

JP-Ab. 2-173 436: Patents Abstracts of Japan, "Universal Belt", of Nec Corp., Appl. date 04 Jul. 1990, 1 page (published 18 Sep. 1990, vol. 14, No. 436).

Primary Examiner—Michael Powell Buiz
Attorney, Agent, or Firm—Kenyon & Kenyon

[57] ABSTRACT

A motor driven door drive mechanism is provided having a belt transmission including a flat belt or a round belt which passes around two rotating guide wheels of which at least one is driven to take along the belt. The driven wheel is embodied by a gear and another gear is provided which loosely meshes with the drive gear, partly pressing the belt into the gaps between the teeth thereof. This arrangement offers a sound compromise between the amount of drive force that can be transmitted, and the manufacturing cost and results in low noise level in operation.

15 Claims, 2 Drawing Sheets

DOOR DRIVE MECHANISM INCLUDING BELT TRANSMISSION FOR DOORS

FIELD OF THE INVENTION

The instant invention relates motor driven door drive means, especially for garage doors or workroom doors of the wing or panel type or of sectional or over-the-head design, comprising a drive belt transmission. The invention further relates to an automobile garage door or a workroom door with such door drive means. The invention still further relates to a belt transmission comprising a transmission belt which is passed around two rotating guide wheels or other guide members, at least one of which is driven to take along the belt. The drive of said one guide wheel may serve to drive also the other guide wheel, through said belt. The guide wheels, on the other hand, may serve to drive merely the belt if the latter is provided with an engagement piece or other pickup means from which to derive the driving force for the door leafs, panels, or sectional members or wings.

BACKGROUND OF THE INVENTION

Door drives comprising belt transmissions, belt transmissions, and doors operated by belt transmissions of the type mentioned above have been known for a long time in the most varied forms. The belt transmission may comprise a flat belt which is passed under tension around cylindrical pulleys, whereby the drive force is transmitted from the driven pulley to the belt by force or friction lock. Greater forces can be transmitted if V belts are used which are passed around grooved V belt pulleys (JP 2-173,436 A, Patent Abstracts of Japan, Vol. 14, No. 436, Sep. 18, 1990). It is likewise known to devise the transmission belt as a toothed belt for cooperation with a drive wheel provided with complementary teeth along its periphery (DD 238,093 A1; FR 1,379,737 A). Other comparable drive means operate with round belts, such as smooth steel cables which are guided around grooved pulleys, or steel cables on which balls or the like are fastened at certain intervals for engagement in complementary, grooves with cavities formed in corresponding guide wheels. Moreover, chain drives comprising suitable sprockets are used as door propelling means. Many of these measures are intended to warrant that the drive force is transmitted in form lock. The fields of application of these drive means partly differ from one another, while they overlap in other respects. The strengths and weaknesses, or the advantages and disadvantages, of all these drives are well known. Those skilled in the art likewise dispose of sufficient knowledge concerning materials which are suitable for flat belts, round belts, and V belts.

SUMMARY OF THE INVENTION

It is the object of the invention to provide a novel door drive, a novel belt transmission, and a novel door comprising a door leaf which is driven by such novel belt transmission.

It is a further object of the invention to offer a satisfactory compromise between the transmissible drive force, operational reliability, manufacturing cost, and low noise level in operation of the belt transmission.

The invention resides within this means in the drive wheel being embodied by a motor driven gear and at least another gear being provided which meshes loosely with said gear to take along a belt made of deformable fiber material, during rotation, by the tips of the teeth of one gear pressing the belt into the gaps between teeth of the other gear to such an extent that the belt is driven practically without slip.

The pliable, partly yielding belt may be a flat or round textile band made of synthetic fibers or in particular of synthetic filaments, in other words it may be a woven, braided, or twisted belt which, moreover, can be treated, untreated, rubberized or not. A great variety of flat belts are known.

However, the only suitable materials are those which can be permanently deformed or stretched. Polyethylene filaments are not very well suited in this context. Good results, on the other hand, are achieved if the belts are made of cold-stretched polyester, polyamide or polypropylene cord filaments. The admissible peripheral or running speed is inherently limited. The belt should be made of a material which gradually becomes permanently deformed, being stretched and becoming stabilized by the great number of passes between gears.

Flat belts preferably are made of a woven or braided fabric, the thickness and width of which depend on the force to be transmitted and the desirable performance.

Any inexpensive, commercially available belt or rope of synthetic filaments, such as known for slatted roller blinds is sufficient if the belt transmission is used to drive a garage door or a workroom door or if it is employed in a gate drive means or a garage or workroom door comprising means to transmit the driving force for opening and closing the door leaf.

The gears may be conventional gears having teeth which are rounded at the outer edges, or they may be matched gears. The driven gear is formed with a circumferential groove if the belt used is a round belt. A plurality of such round belts can be used in order to increase the drive force than can be transmitted. In the latter event, the gear includes a corresponding number of grooves in each of which approximately one half of a round belt is accommodated.

In operation, the belt or band is gradually deformed permanently, adopting a corrugated configuration which, surprisingly, does not stretch even under the loading of the drive pull. The drive force mainly is introduced in form lock, and yet no belt is needed which is profiled to begin with, such as a toothed belt. As a consequence, the transmission of force is greater than in the case of belts which remain flat and are driven solely by friction-lock engagement. If the belt is wider than the driven gear so as to project somewhat at both sides, especially by from about 5 to 10 mm, the embossing or stamping of the belt is restricted to the central zone. In this event, therefore, the two outer marginal zones do not become embossed and it is their task in the transmission of force to help maintain the length and tension in the belt transmission. The embossing in the central driving area of the belt occurs by stretching of the material during the run-in phase. The straight, undrawn side portions guarantee that the embossing obtained in the middle by stretching remains stable. This effect can be achieved most easily by providing a non-driven gear which is wider than the driven gear.

Different diameter gears may prove to be convenient because, on the one hand, that facilitates engagement and, on the other hand, switchover is possible from the drive of one gear to that of another so that a kind of changeover gear mechanism is established by which the running speed of the belt can be changed from one to another. In operation, it proved that the drive is effected practically without slip, even when shock loading occurs. Three travelling speeds of the transmission belt can be obtained if three intermeshing gears of different diameters are provided around which the drive belt passes.

The costs of the belt are relatively low when compared to chains, V belts, toothed belts, and the like, amounting in part to no more than about 10% of the former. In principle, the belt transmission can be used with different gears, i.e. gears having different tooth modules (different pitch). Usually it is unnecessary to have belts made especially for the purpose in question. Where the drive performance is not too high, such as in the case of driving doors of garages for one or two automobiles, all that is needed are roller blind belts or textile ropes. These belts and similar ones are highly elastic and, therefore, can move also around small gears. The top and bottom surfaces of such a belt have the same grip. In operation it shows how very little noise they generate since no metallic parts move in mutual engagement. The belts can be purchased by the yard. They can be made into endless belts with the aid of screws, adhesives or by vulcanizing. Especially in the event of using textile belts, these may be colored so as to specific characteristic effects. As compared to flat belts, round belts have the advantage that any twist occurring in the course of use around the longitudinal axis of the belt practically remains invisible.

BRIEF DESCRIPTION OF THE DRAWING

The invention will be described further, by way of example, with reference to the accompanying drawings, in which.

Figure 1:
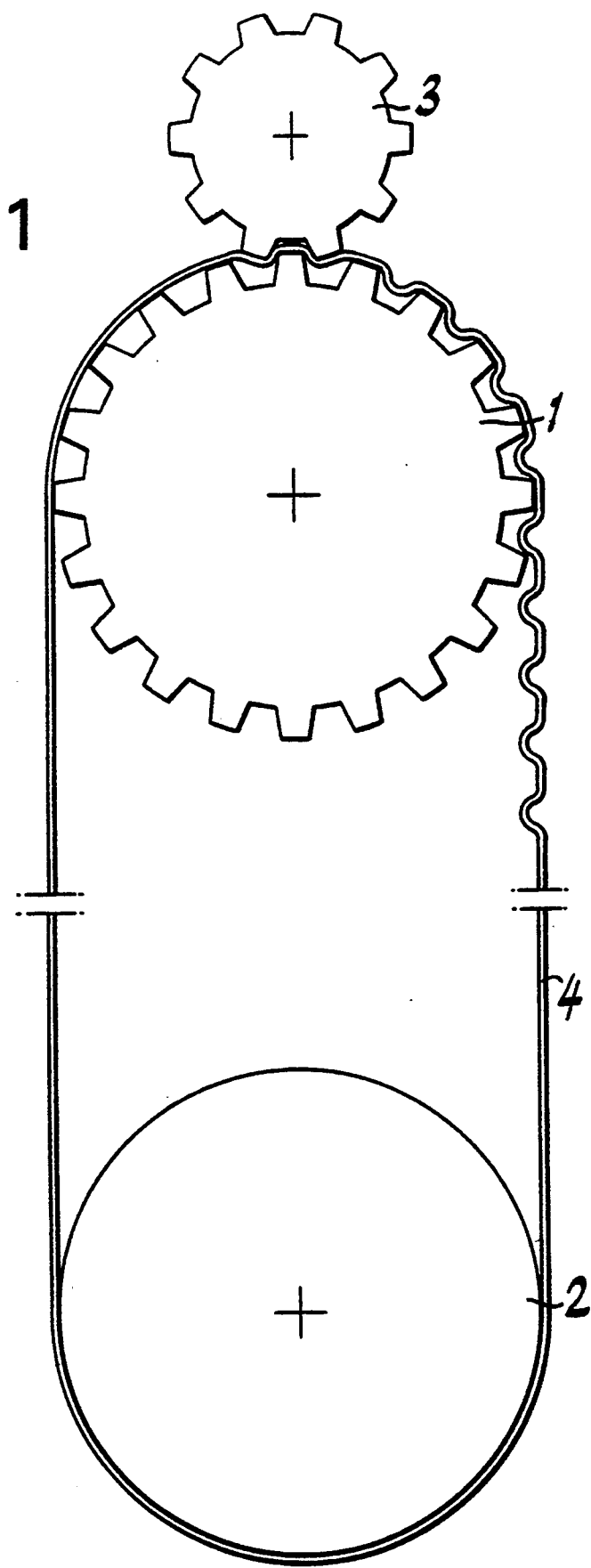
FIG. 1 is a longitudinal sectional elevation of a door drive means including a flat belt transmission having a pair of meshing gears.

The door drive means including a belt transmission is of basically conventional design and is therefore not explained in detail as it is known to the man skilled in the art.

DESCRIPTION OF THE PREFERRED EMBODIMENTS

The belt transmission comprises a drive gear 1, a driven wheel 2 disposed at the particular distance required, a second gear 3 which meshes loosely with the first gear 1 and takes over the function of embossing the woven drive band or transmission belt 4. The spacing between wheels 1 and 2 may be as great as required in any particular case. The flat drive belt 4 is a textile belt which is disposed under light tension around gear 1 and wheel 2. The embossing gear 3 is moved into engagement with the drive gear 1 under light tension or resiliently, if desired. This approach is realized in such a way that the teeth of the embossing gear 3 press the belt 4 somewhat into the gaps between teeth of the driven gear 1.

After some thousand passings or revolutions, the belt has become permanently corrugated. The waves are exactly identical with the tooth module of the drive gear. In the range of the meshing between the two gears, the flat belt has become a corrugated belt with permanent undulations. The belt material is selected in consideration of this desirable permanent deformation.

In principle, it is possible also to use thin belts of which the corrugation achieved in operation is not permanent. However, this type of belt is less desirable. These belts tend to sag in the returning run. And, although the sag can be taken care of by tension rollers, this would render the drive complicated if destined for operation in two directions. The fact that the textile belt immerses in the space between the teeth of the drive gear practically excludes any slip. In principle, the big gear 1 shown in the drawing may serve as the drive gear, or the smaller one which is designated embossing gear 3. If the drive can be switched between these two gears, the belt 4 can be operated at two travelling speeds.

Figure 2:
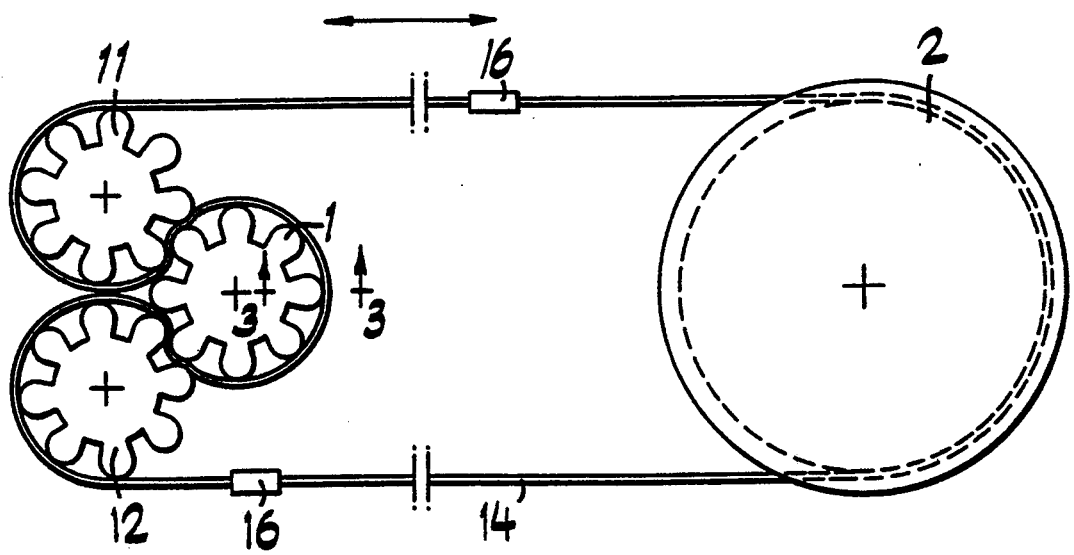
FIG. 2 is a longitudinal sectional elevation of a door drive means including a round belt transmission having two pairs of meshing gears.

As shown in FIG. 2, the belt 4 is provided with a pickup means or an engagement piece 16. This engagement piece 16 will not run up on either one of the wheels 1 and 2 if the reciprocations operating path is smaller than the spacing between them, for example in the case of a garage door which is movable in two directions.

Figure 3:
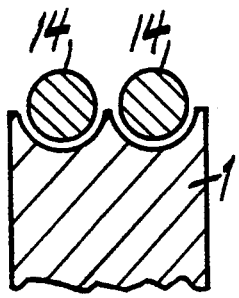
FIG. 3 is an enlarged cross-section view of a portion of a gear in FIG. 2 taken generally along line 3—3.

As shown in FIG. 2, this embodiment comprises two gears 11 and 12 which cooperate with the driven gear 1. The teeth of the two additional gears engage somewhat in the gaps between the teeth of gear 1. A plurality of round belts 14, having a diameter in the range of from about 6 to 8 mm, pass in parallel with one another around wheel 2 as well as gears 1, 11, and 12. The round belts of polyamide filaments are embodied by woven round cords positioned in approximately semicircular grooves formed in the circumference of the driven gear 1 (as shown in FIG. 3) and preferably also in that of wheel 2. The meshing gears 11 and 12 have no grooves, instead their teeth merely press the round belts a little into the gaps between teeth of gear 1. The drive force which can be transmitted is increased and the safety of the belt drive enhanced by the fact that a plurality of round belts 14 can be arranged parallel to each other. If one round belt should fail, the others continue to operate.

What is claimed is:

1. A door drive means for wing-, panel-, sectional- or over-the-head-type doors, in particular for automobile garages or workrooms, comprising a belt transmission having a belt or band which passes around at least two rotating guide wheels, one of which being a drive wheel, and further having means by which the drive force for opening and closing of the door is derived from the belt or from a guide wheel and transmitted to the door, wherein the drive wheel is embodied by a first gear and wherein at least another gear is provided which meshes loosely with the first gear, pressing the belt being made of deformable fiber material into the gaps between teeth of the first gear to such an extent that the belt travels practically without slip.

2. The door drive means as claimed in claim 1, wherein the belt is made of a material which gradually becomes permanently deformed, especially polyester, the material being stretched and becoming stabilized by a great number of passes between the gears.

3. The door drive means as claimed in claim 1, wherein the belt is embodied by a flat belt.

4. The door drive means as claimed in claim 1, wherein the belt is embodied by a round belt.

5. The door drive means as claimed in claim 4, wherein a plurality of round belts are provided side by side.

6. The door drive means as claimed in claim 5, wherein the driven gear is formed with a separate circumferential groove for each round belt, and approximately one half of each round belt is received in its associated groove.

7. A belt transmission especially for use in a door drive means, comprising a belt which is passed around at least two rotating guide wheels, including at least one drive wheel to entrain the belt, wherein the drive wheel is embodied by a gear and at least another gear is provided which meshes loosely with said gear to take along the belt being made of deformable fiber material, during rotation, by the tips of the teeth of one gear pressing the belt into the gaps between teeth of the other gear to such an extent that the belt travels practically without slip.

8. The belt transmission as claimed in claim 7, wherein the belt is made of a material which gradually becomes permanently deformed, especially polyester, the material being stretched and becoming stabilized by a great number of passes between the gears.

9. The belt transmission as claimed in claim 8, wherein the belt is embodied by a flat belt.

10. The belt transmission as claimed in claim 9, wherein the belt is wider than at least one of the gears and projects somewhat in lateral direction, especially by from about 5 to 10 mm.

11. The belt transmission as claimed in claim 8, wherein the belt is embodied by a round belt.

12. The belt transmission as claimed in claim 11, wherein a plurality of round belts are provided side by side.

13. The belt transmission as claimed in claim 11, wherein the drive gear is formed with a separate circumferential groove for each round belt, and approximately one half of each round belt is received in its associated groove.

14. The belt transmission as claimed in claim 7, wherein the gears have different diameters.

15. The belt transmission as claimed in claim 7, wherein the gears have different diameters and are configured to permit the switchover of the drive from one gear to another.

* * * * *